United States Patent [19]

Buzzelli

[11] 3,925,100
[45] Dec. 9, 1975

[54] METAL/AIR CELLS AND AIR CATHODES FOR USE THEREIN
[75] Inventor: Edward S. Buzzelli, Export, Pa.
[73] Assignee: Westinghouse Electric Corporation, Pittsburgh, Pa.
[22] Filed: Feb. 26, 1974
[21] Appl. No.: 446,088

[52] U.S. Cl. .............................. 136/86 A; 136/138
[51] Int. Cl. ......................................... H01m 27/04
[58] Field of Search .......... 136/86 A, 138, 136, 139

[56] References Cited
UNITED STATES PATENTS

| | | | |
|---|---|---|---|
| 2,615,932 | 10/1952 | Marko et al. | 136/86 A |
| 2,775,534 | 12/1956 | Herbert | 136/139 |
| 3,060,254 | 10/1962 | Urry | 136/138 |
| 3,600,231 | 8/1971 | Dawson | 136/138 |

*Primary Examiner*—John H. Mack
*Assistant Examiner*—H. A. Feeley
*Attorney, Agent, or Firm*—Alex Mich, Jr.

[57] ABSTRACT

An air cathode for use in metal/air cells comprising a hydrophobic layer laminated to hydrophilic layer wherein the hydrophilic layer comprises a metal current collector integrally molded into a composition comprising:
  i. an oxygen absorption/reduction carbon,
  ii. 50 to 70% by weight manganese dioxide,
  iii. at least one of polytetrafluoroethylene and fluorinated ethylene propylene, and
  iv. Ag-Hg catalyst.

The hydrophobic layer preferably comprises a sheet of porous, unsintered, completely fibrillated polytetrafluoroethylene which is laminated to the hydrophilic layer.

A metal/air cell is provided which includes said air cathode together with a spaced apart anode selected from iron, zinc, cadmium, or like metal, in an alkali hydroxide electrolyte.

7 Claims, 3 Drawing Figures

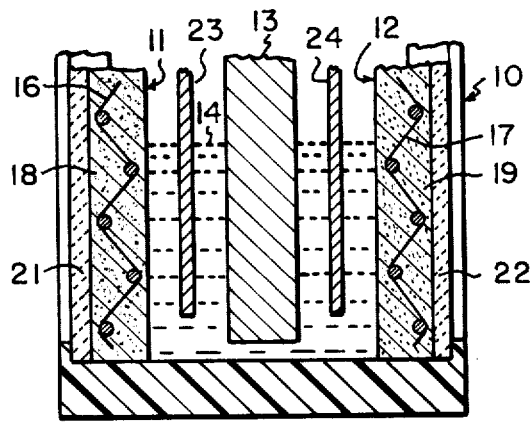
Fig. 1
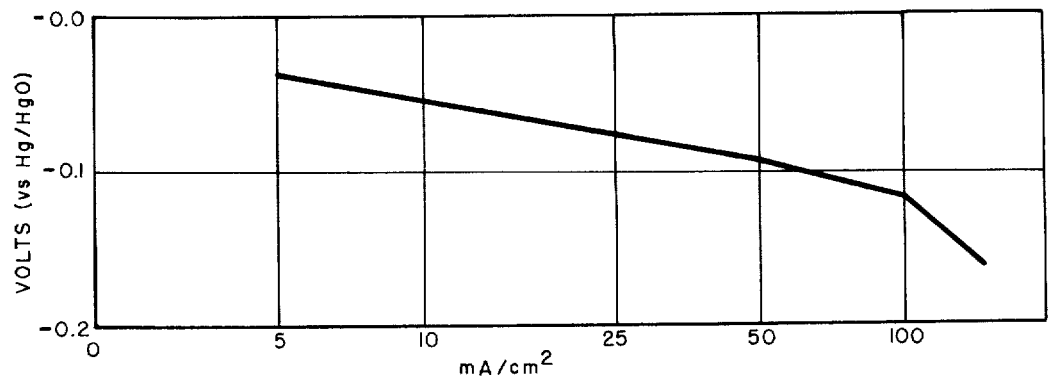
Fig. 2 POLARIZATION CURVE OF AIR ELECTRODE OF EXAMPLE I
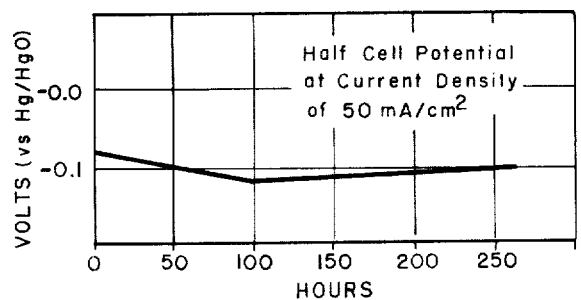
Fig. 3 LIFE CURVE OF AIR ELECTRODE OF EXAMPLE I

3,925,100

METAL/AIR CELLS AND AIR CATHODES FOR USE THEREIN

FIELD OF THE INVENTION

The present invention relates to an improved air/oxygen electrode for use in metal/air batteries, and, in particular, an air electrode for use in metal/air rechargeable batteries.

BACKGROUND OF THE INVENTION

The advantages of light weight electrodes for use in electro-chemical cells such as fuel cells and metal/air batteries has been well recognized. Typically, an electro-chemical cell includes a gas diffusion cathode capable of generating electricity by electro-chemically combining an oxidizable reactant with a reduceable reactant. These cells comprise spaced electrodes ionically connected by an electrolyte, such that when the fuel and oxidant are concurrently and separately supplied to electrodes of the cells an electrical potential develops across the electrodes. Such electrodes normally comprise a porous support coated with a catalytic material such as a dispersion of noble metal black and hydrophobic polymer, or a continuous hydrophobic film in contact with an electro-catalyst.

The electrodes are extremely thin and have low internal electrical resistance and take up only a very small amount of space permitting the construction of highly compact cells having a high energy to volume and energy to weight ratio. Illustrative of various metal/air cells, or electrodes for use therein include U.S. Pat. Nos. 3,553,024, 3,513,030, 3,488,225, 3,419,900, and 3,649,361.

It is an object of the present invention to provide an air electrode for use in metal/air cells or batteries which overcomes the problems of high polarizations and decays in performance as a function of time generally exhibited by air electrodes of the prior art. A further object of the present invention is to provide an air electrode having superior voltage performance and relatively flat life characteristics.

SUMMARY OF THE INVENTION

Generally, the air electrode of the present invention includes a hydrophilic layer which comprises a current collector of metal fibers and a hydrophilic composition containing electro-chemically active materials into which the current collector is pressed or mold formed, and a hydrophobic layer laminated to the molded hydrophilic layer. The hydrophilic composition of the present invention includes a high surface area carbon, preferably a silver-mercury catalyst, a wet-proofing agent such as polytetrafluoroethylene, and manganese dioxide. It has been found that by the incorporation of manganese dioxide into the hydrophilic layer in combination with the high surface area carbon, substantial improvement in the voltage performances as well as life characteristics results.

The high surface area carbon is utilized in the hydrophilic composite for the absorption of oxygen which can be electro-chemically converted to active carbon carrier. Preferably, a silver-mercury catalyst is used in the present invention to decompose secondary products that build up in the electrode as a result of the oxygen reduction mechanism. Thus, while the electrode of the present invention performs well without a catalyst, the life characteristics are not as good, because the secondary products, typically perhydroxyl groups, create severe electropolarization results if allowed to build up in significant amounts. The Ag-Hg catalyst, on the other hand, has been found to decompose peroxide in a manner substantially equivalent to formerly used platinum and other noble metals catalysts. Accordingly, the use of a catalyst is preferred.

Most importantly, however, is the utilization of manganese dioxide in combination with the Ag-Hg catalyst and high surface area carbon. It is believed that the manganese dioxide decomposes peroxides as well as reduces the oxygen. For example, manganese dioxide participates in the oxygen reduction by giving up oxygen ions to the system, and then, because of its intimate contact with the high surface area carbon, can be reoxidized to a higher oxide form, where it again participates in the electrochemical reduction. Furthermore, it is believed that the manganese dioxide, along with the Ag-Hg catalyst, catalytically decomposes the peroxide groups formed within the electrode.

Preferably, the components of the hydrophilic composite are mixed together in powder form to which deionized water is added to form a paste-like consistency. The fiber metal mesh current collector, preferably nickel or nickel plated steel, is then integrated within the pastelike composition and press molded into the hydrophilic layer. To this molded composite layer is laminated a hydrophobic layer of porous, fibrillated, unsintered polytetrafluoroethylene having a total porosity of from about 35 to 60% by volume and a thickness from 0.005 to 0.20 inch. The hydrophobic layer is capable of permitting rapid diffusion of gas, such as oxygen and air, but prohibits the passage therethrough of electrolytes such alkali hydroxides used in the metal/air batteries of the present invention.

The electrodes of the present invention have been found to operate for longer than 4,000 hours. Moreover, air electrodes of the present invention were found to have a performance level of 50 to 200 mV better than other known useful air electrodes systems at 50 milliamps per $cm^2$. Other advantages, however, will be seen from a perusal of the following detailed description of a presently preferred embodiment taken in connection with the accompanying drawings.

BRIEF DESCRIPTION OF THE DRAWINGS

FIG. 1 is a sectional elevation of the metal/air battery utilizing an air electrode of the present invention;

FIG. 2 is a polarization curve of an air electrode of the present invention; and FIG. 3 is a life curve of an air electrode of the present invention.

PRESENTLY PREFERRED EMBODIMENTS

With reference to FIG. 1, metal/air cell 10 comprises a pair of air electrodes 11 and 12. Metal/air cell 10 also includes a metal electrode 13 spaced apart from air electrodes 11 and 12 and ionically connected thereto by electrolyte 14. Metal electrode 13 is preferably a metal selected from iron, zinc, or cadmium, and electrolyte 14 is an alkali hydroxide, preferably KOH.

Air cathodes 11 and 12 each include current collectors 16 and 17, respectively, integrally formed within the hydrophilic composites of the present invention to form hydrophilic layers 18 and 19. Laminated to the respective hydrophilic layers of each electrode are hydrophobic layers 21 and 22, respectively. Hydrophobic layers 21 and 22 are positioned within cell 10 so as to form sealed windows in which oxygen or air in contact therewith can diffuse into the hydrophilic layer, but through which the electrolyte cannot pass.

To make cell 10 into a rechargeable battery, a pair of counter-electrodes 23 and 24 are positioned between metal electrode 13 and air electrodes 11 and 12, respectively. Preferably, counter-electrodes 23 and 24 are fabricated from nickel or nickel plated steel.

Preferably, the hydrophilic composites comprise 50 to 70% by weight manganese dioxide, 40 to 25% by weight carbon, 9 to 4% or less nonwetting agent such as polytetrafluoroethylene, and catalytic amounts of Ag-Hg. By adjusting the percentage amounts of the components within the preferred ranges, various characteristics can be optimized.

It has been found that the crystalline structure of the manganese dioxide is not critical. However, it is preferable that the manganese dioxide be incorporated into the composite in a size range of from 7 to 10 microns. Moreover, it has been further found that the type of carbon utilized is not critical. However, a high purity activated carbon manufactured from wood charcoal wherein the activation is obtained by treating the raw material with heat and steam has been found suitable for use in the present invention. This treated material is then washed with a strong mineral acid and then with water to yield a carbon containing less than about 0.3% water extractible material. The surface area of the carbon is approximately 570 square meters per gram of bulk density of about 25 pounds per cubic foot. Various types of electrically conductive carbon have been found suitable for use in the present invention as well as mixtures thereof.

Additionally, a nonwetting component such as polytetrafluoroethylene and/or fluorinated ethylene propylene should be incorporated into the composition to prevent gross flooding of the electrode by the electrolyte.

The components are mixed together with deionized water to a paste-like consistency. The composition is then spread over and through electronic current collectors 16 and 17, each preferably formed as an array of 1 mil nickel or nickel plated steel fibers sintered together to form a plaque with a theoretical density of about 6% at a thickness of 45 mils. The composition is permitted to air dry and is thereafter flat-bed pressed at temperatures between 250° and 300°C and pressures between 0.25 and 3.0 tons/in$^2$.

The pressing procedure results in hydrophilic layers 18 and 19 having a thickness of from 0.045 to 0.010 inch. Pressing the composition and current collector into a molded layer both thermally reduces the catalyst to the metal species and increases the overall electrical conductivity of the plaque by compaction.

Hydrophobic layers 21 and 22 preferably comprise a sheet of porous, unsintered, completely fibrillated polytetrafluoroethylene as set forth in U.S. Pat. No. 3,407,249, incorporated herein by reference. The hydrophobic layer is laminated to the hydrophilic layer by passing both layers through a two roll mill. Preferably, the roll surfaces are maintained at a temperature of about 190°C and a pressure therebetween of about 25 psi. Other methods of securing hydrophobic layers 21 and 22 to the respective hydrophilic layers are possible to prepare air electrodes 11 and 12.

Typically, electrodes 11 and 12 are framed in a material such as ABS plastics. The framed air electrode is then mounted in a cell casing, as shown in FIG. 1, which is usually made of a similar material. The electrode frame provides the necessary seal to prevent leakage of electrolyte from the cell.

The following nonlimiting examples are illustrative of the present invention.

EXAMPLE 1

A small 3 ¼ × 3 ¾ inch air electrode was fabricated by blending together 0.75 gram Darco G–60 carbon, 0.250 grams Nuchar carbon, 2 grams of manganese dioxide, 16 drops of Teflon 30B, 0.075 gram $AgNO_3$, and 0.075 gram Hg acetate. The blended mixture was formed into a paste by the addition thereto of deionized water. The paste was then forced into a sintered nickel laminate plaque comprising a 3 ¼ × 3 ¾ inch assembly of 1 mil fibers with a theoretical density of 6% and a thickness of 0.045 inch. The resulting composite plaque was air dried and thereafter pressed at 1.5 tons per inch squared at 250° for 10 to 20 minutes to provide a hydrophilic layer having a thickness of about 0.020 mils. A sheet of porous, unsintered, completely fibrillated polytetrafluoroethylene having a thickness of about 10 mils, was roll laminated to the hydrophilic layer as described above.

An experimental half cell was used to evaluate the air electrode thusly fabricated. The air electrode was tested with a nickel counter-electrode placed in a cell container and a Hg/HgO reference electrode. The cell contained 25% KOH electrolyte with an inner electrode distance of about ½ inch. The window area, or the area of the air electrode for gas diffusion was fixed at approximately 44 cm$^2$. The restriction was established as part of the frame holding the air electrode within the cell.

The half cell was assembled and connected to a dc power supply with a negative connection to the air electrode, and a positive connection to the nickel counter-electrode. A preset current was passed through the cell and the voltage of the air electrode to the Hg/HgO reference electrode measured. The current was then changed and the corresponding voltages between the air electrode and the references plotted. The current used for the 44 cm$^2$ electrode at 50 milliamps/cm$^2$ was 2.2 amps. Multiples of the current were used to generate a polarization current which indicated the electrode performance at various current densities. The results of these experiments are graphically represented in FIGS. 2 and 3.

Generally, it was found that the electrical performance in the described half cell was found to be about 100 mV below a Hg/HgO reference electrode at 50 mA/cm$^2$. At 100 milliamps/cm$^2$ the polarization was about 170 millivolt below Hg/HgO. Furthermore, it was found that the electrodes were stable in performance, using unscrubbed air, for greater than 250 hours with little or no deterioration.

EXAMPLE 2

A second electrode was fabricated having a window area of 1050 cm$^2$ utilizing the same ratio of components as set forth in Example 1. This electrode was found to have a performance level 50–200 millivolts better than other known useful air electrode systems at 50 mA/cm$^2$. In particular, the air electrode of this example had a polarization of about −80 mV with respect to a Hg/HgO reference electrode at a current density of 50 mA/cm$^2$.

While presently preferred embodiments of the invention have been shown and described in particularity, it may otherwise be embodied within the scope of the appended claims.

What is claimed is:

1. An air electrode for use in metal/air cells comprising:
   A. a hydrophilic layer including the composition comprising:
      i. an oxygen absorption/reduction carbon,
      ii. 50 to 70% by weight manganese dioxide,
      iii. at least one of polytetrafluoroethylene and fluorinated ethylene propylene, and
      iv. metal fiber current collector integrally molded into said composition to form said layer; and
   B. a porous, unsintered, completely fibrillated polytetrafluoroethylene hydrophobic sheet laminated to said hydrophilic layer, wherein said composition includes a silver-mercury catalyst.

2. An air electrode as set forth in claim 1 wherein said carbon is present in an amount from about 25 to 40% by weight, and said polytetrafluoroethylene is present in an amount of from about 1 to 9% by weight.

3. A metal/air cell comprising a metal anode selected from the group consisting of iron, zinc, and cadmium; at least one air electrode as set forth in claim 1 spaced apart from said anode; and an alkali hydroxide electrolyte in contact with said anode and said cathode.

4. A metal/air cell as set forth in claim 3 wherein said electrolyte is potassium hydroxide.

5. A metal/air rechargeable secondary cell comprising a metal anode selected from the group consisting of iron, zinc, and cadmium; at least one air electrode as set forth in claim 1 spaced apart from said anode, at least one counter-electrode spaced between said air electrode and said anode; and an alkali hydroxide electrolyte in contact with said anode, air electrode and counter-electrode.

6. A metal/air secondary cell as set forth in claim 5 wherein said electrolyte is potassium hydroxide.

7. A metal/air secondary cell as set forth in claim 5 wherein said counter-electrode is selected from the group consisting of nickel and nickel plated steel.

* * * * *